United States Patent
Moran

(10) Patent No.: US 7,502,565 B2
(45) Date of Patent: Mar. 10, 2009

(54) CIRCUIT FOR FILTERING A LASER SIGNAL

(75) Inventor: Timothy G. Moran, San Jose, CA (US)

(73) Assignee: Finisar Corporation, Sunnyvale, CA (US)

(*) Notice: Subject to any disclaimer, the term of this patent is extended or adjusted under 35 U.S.C. 154(b) by 503 days.

(21) Appl. No.: 11/072,377

(22) Filed: Mar. 4, 2005

(65) Prior Publication Data

US 2005/0195866 A1    Sep. 8, 2005

Related U.S. Application Data

(60) Provisional application No. 60/550,547, filed on Mar. 5, 2004.

(51) Int. Cl.
*H04B 10/08* (2006.01)
*H04B 10/12* (2006.01)
*H04B 10/02* (2006.01)
*H04B 10/04* (2006.01)

(52) U.S. Cl. .................. 398/148; 398/149; 398/177; 398/195; 398/33

(58) Field of Classification Search ............ 398/25, 398/33, 147, 149, 177, 192, 193, 195, 202, 398/208; 372/29.011, 29.015, 38.02, 38.08
See application file for complete search history.

(56) References Cited

U.S. PATENT DOCUMENTS

| | | | | |
|---|---|---|---|---|
| 6,146,331 A | * | 11/2000 | Wong | 600/454 |
| 7,003,228 B2 | * | 2/2006 | Wang et al. | 398/85 |
| 7,039,330 B2 | * | 5/2006 | Lenosky | 398/208 |
| 7,266,310 B1 | * | 9/2007 | Savory et al. | 398/205 |
| 2005/0141440 A1 | * | 6/2005 | Stetson et al. | 370/286 |

* cited by examiner

*Primary Examiner*—Dalzid Singh
(74) *Attorney, Agent, or Firm*—Workman Nydegger

(57) ABSTRACT

A laser filter circuit includes an input terminal configured to receive an input laser signal and a first filter chain configured to generate a filtered signal. The first filter chain is coupled to the input terminal and has one or more filters connected in series. Each filter includes one or more adjustable capacitor networks. An adjustable capacitor controller generates one or more capacitor switch control signals based on an operating frequency of the input laser signal. The one or more control signals are for adjusting the capacitance of the one or more adjustable capacitor networks in the first filter chain. A plurality of output terminal output the filtered signal from the first filter chain.

10 Claims, 5 Drawing Sheets

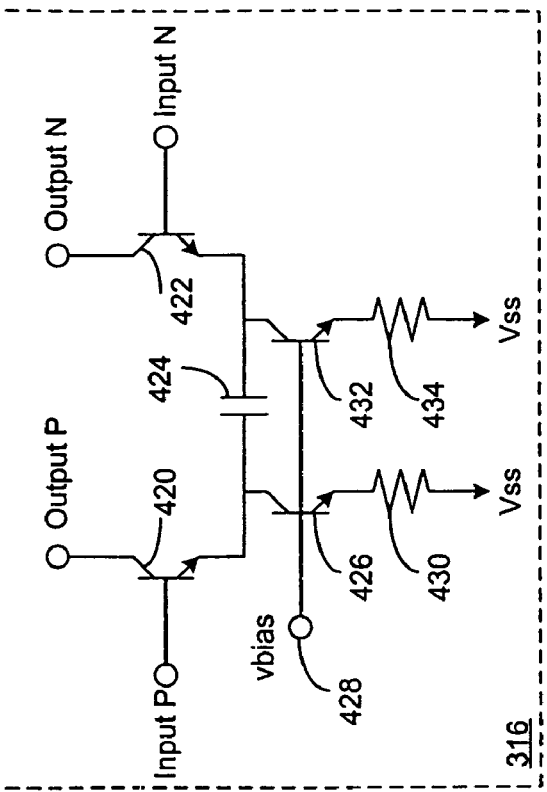
FIG. 4C
FIG. 4D
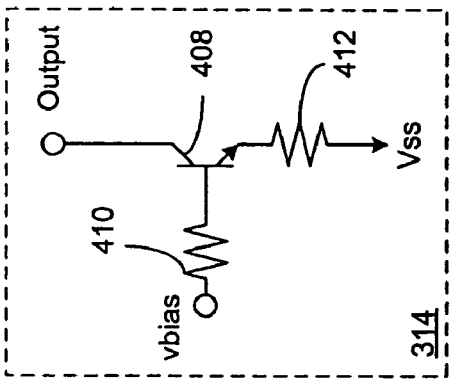
FIG. 4A
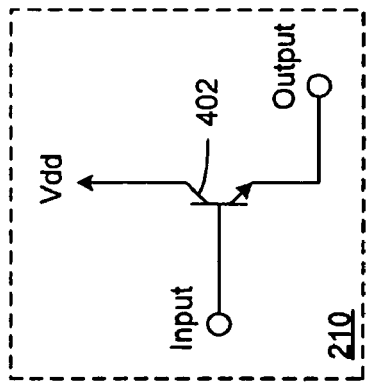
FIG. 4B

CIRCUIT FOR FILTERING A LASER SIGNAL

CROSS-REFERENCE TO RELATED APPLICATIONS

This application claims priority to U.S. Provisional Application No. 60/550,547 filed Mar. 5, 2004 titled "A Circuit For Filtering A Laser Signal" which is incorporated herein by reference in its entirety.

BACKGROUND OF THE INVENTION

1. The Field of the Invention

The present invention relates to the field of high-speed data communication. In particular, the present invention relates to a circuit and method for filtering a laser signal.

2. Description of the Related Art

In high-speed communication systems, laser signals may be used to transmit information. For example, a laser signal (transmitted by a remote device, for example) may be detected by a photo detector, amplified by a trans-impedance amplifier circuit, and then filtered by a filter circuit. After the laser signal is filtered, it is then amplified by an amplification circuit and converted to a digital format for further processing and storage. Traditionally, a set of low pass filters are used to filter out noise from the laser signal and to filter out higher order harmonics created by the photo detector and the trans-impedance amplifier prior to the amplification stage. These low pass filters are typically implemented externally to an amplification integrated circuit (IC) by using inductors, capacitors, and resistors.

However, there are a few problems associated with the external low pass filters. The external components of the filter circuits occupy a significant amount of space on a circuit board, and they add significant costs to the system. Another problem with the external filter circuits is that once the circuit components are placed on a circuit board, the characteristics of the low pass filters may not be easily adjusted, because the sizes of the inductors, capacitors and resistors used to implement the low pass filters are fixed. However, in real world applications, a laser signal filter circuit needs to support of a wide spectrum of signal bandwidths, which requires the filter circuit to operate at different frequencies. For example, an external filter circuit may work well in a normal transmission rate. But the filter quality degrades when the frequency of the laser signal is increased to twice or four times the normal transmission rate. Yet another problem with the prior art filter circuits is that the capacitors used to implement the filter circuits may not be easily adjusted to compensate for deviations of circuit devices caused by semiconductor manufacturing process variations.

Therefore, there is need for reducing the costs associated with the circuit components of the external filter circuits. There is a need for minimizing the board space occupied by such external circuit components. In addition, there is a need for a laser signal filter circuit that supports a wide spectrum of laser signal bandwidth applications without degrading the quality of the filtered signal. Furthermore, there is a need for adjusting the characteristics of individual filters by tuning the capacitors within the filtered circuit in order to compensate for deviations caused by variations in the manufacturing of integrated circuit devices containing the filter circuit.

BRIEF SUMMARY OF THE INVENTION

A laser filter circuit for filtering a laser signal includes an input terminal configured to receive an input laser signal and a first filter chain that generates a filtered signal. The first filter chain is coupled to the input terminal and has one or more filters connected in series. Each filter includes one or more adjustable capacitor networks. An adjustable capacitor controller generates one or more capacitor switch control signals based on an operating frequency of the input laser signal. The one or more control signals are for adjusting the capacitance of the one or more adjustable capacitor networks in the first filter chain. A plurality of output terminals output the filtered signal form the first filter chain.

A method for filtering a laser signal includes receiving an input laser signal at an input terminal, and generating a filtered signal using a first filter chain coupled to the input terminal, where the first filter chain has one or more filters connected in series and each filter comprises one or more adjustable capacitor networks. One or more capacitor switch control signals are generated based on an operating frequency of the input laser signal. The one or more control signals are used to adjust the capacitance of the one or more adjustable capacitor networks in the first filter chain. The filtered signal from the first filter chain is output by a plurality of output terminals.

These and other features of the present invention will become more fully apparent from the following description and appended claims, or may be learned by the practice of the invention as set forth hereinafter.

BRIEF DESCRIPTION OF THE SEVERAL VIEWS OF THE DRAWINGS

The aforementioned features and advantages of the invention as well as additional features and advantages thereof will be more clearly understood hereinafter as a result of a detailed description of the embodiments of the invention when taken in conjunction with the following drawings.

FIG. 4A illustrates an implementation of the optional buffer of FIG. 2.

FIG. 4B illustrates an implementation of the bypass circuit of FIG. 2.

FIG. 4C illustrates an implementation of the voltage sensor of FIG. 3.

FIG. 4D illustrates an implementation of the current mirror of FIG. 3.

DETAILED DESCRIPTION OF THE INVENTION

Figure 1:
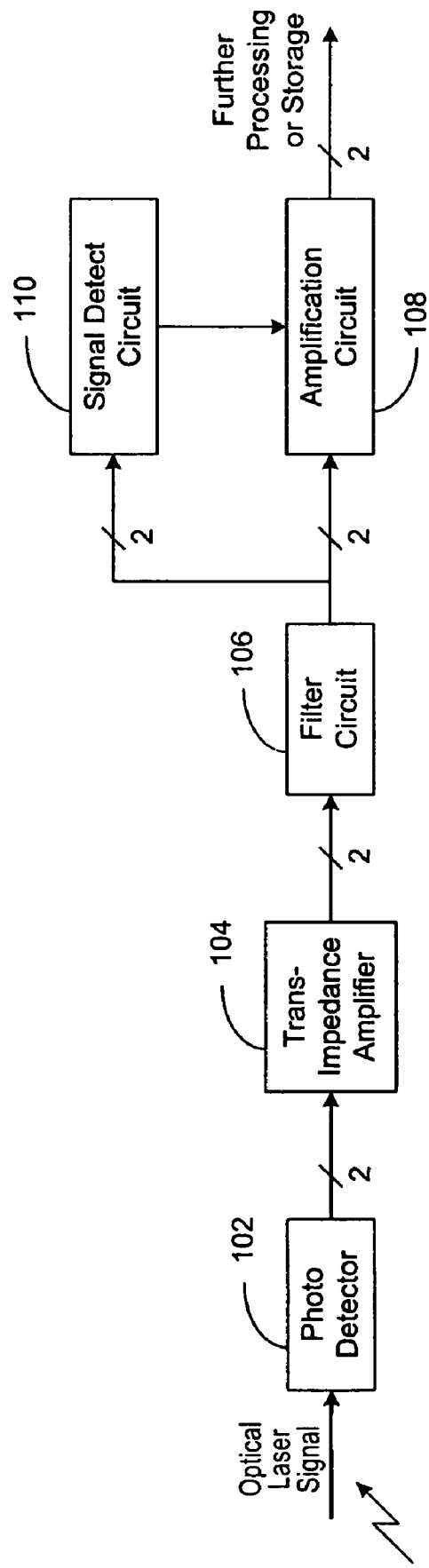
FIG. 1 illustrates an exemplary sub-system for processing and transmitting a laser signal in accordance with the present disclosure.

FIG. 1 illustrates an exemplary sub-system for processing a received optical laser signal. Information carried in a optical laser signal is first detected by a photo detector 102 and converted into an electronic signal format as a pair of differential signals. The pair of differential signals are then processed and transmitted by a trans-impedance amplifier 104 to a filter circuit 106. The output of the trans-impedance amplifier 104 is sometimes herein called the input laser signal, as distinguished from the optical laser signal received by the photo detector 102. The purpose of the filter circuit 106 is to filter out noise as well as to filter out higher order harmonics in the input laser signal. The noise and higher order harmonics may degrade the laser signal quality and generate undesirable electromagnetic interference in the system. After the input laser signal is filtered by the filter circuit 106, it is passed to an amplification circuit 108 for amplifying the input laser signal to a desired single level for further processing or storage. A signal detect circuit 110 is used to detect the strength of the input laser signal in accordance with a predetermined set of signal threshold requirements. One of the output signals of the signal detect circuit 110 is a reference voltage signal, which is provided to the amplification circuit 108 to regulate bias voltages of the amplification circuit 108. The bias voltages in turn control corresponding bias currents of the amplification circuit 108. Another output signal of the signal detect circuit 110 is a system interrupt signal which may be sent to a host device or system controller (not shown) to conduct certain necessary procedures when a laser signal level is lower than the predetermined set of signal threshold requirements.

Figure 2:
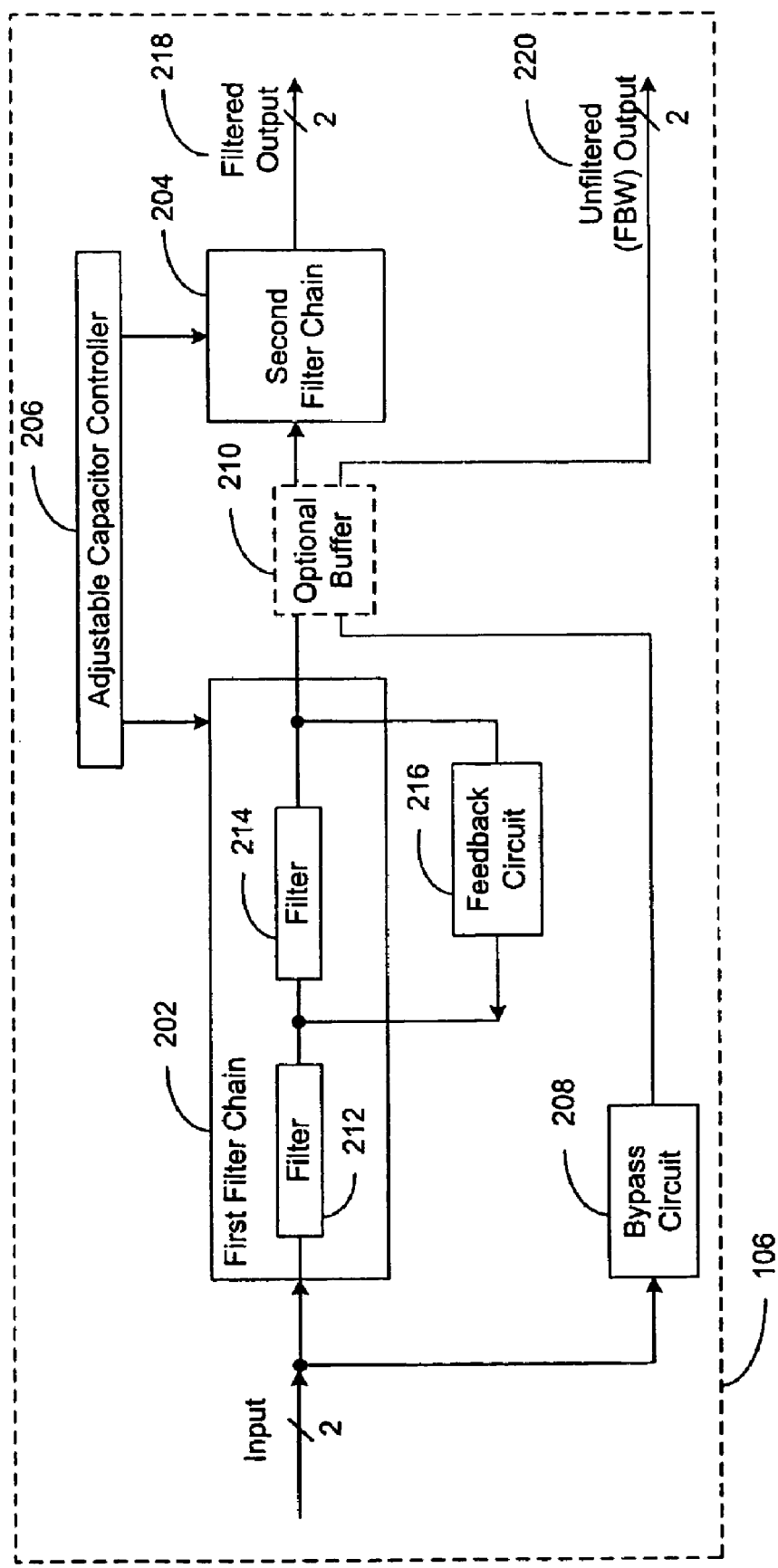
FIG. 2 illustrates an overview of the filter circuit block of FIG. 1.

FIG. 2 illustrates an exemplary embodiment of the filter circuit 106 of FIG. 1. The exemplary embodiment of the filter circuit 106 includes a first filter chain 202, a second filter chain 204 and an adjustment capacitor controller 206. The filter circuit 106 also includes an optional bypass circuit 208 for generating an unfiltered version of the input laser signal. The bypass circuit 208 conveys an input signal from the input of the first filter chain 202 to an output of the first filter chain 202. A bypass circuit 208 may be used to bypass the second filter chain 204 or other filter chains of the filter circuit 106.

The filter circuit 106 further includes an optional buffer circuit 210 for isolating the circuits in second filter chain 204 from the circuits in the first filter chain 202. The first filter chain 202 may include one or more filters, such as filters 212 and 214. The second filter chain may also include one or more filters (not shown). The adjustable capacitor controller 206 controls the adjustment of the capacitors within each filter of the first and second filter chains 202, 204. One or more filters in the first and second filter chain 202, 204 may have a feedback circuit, such as the feedback circuit 216. In some embodiments, the filter circuit 106 generates two pairs of outputs, a first pair of filtered outputs 218 from the second filter chain 204, and a second pair of unfiltered outputs 220 from the bypass circuit 208. A full bandwidth version (sometimes called a full bandwidth mode) of the laser signal is generated by the bypass path.

Figure 3:
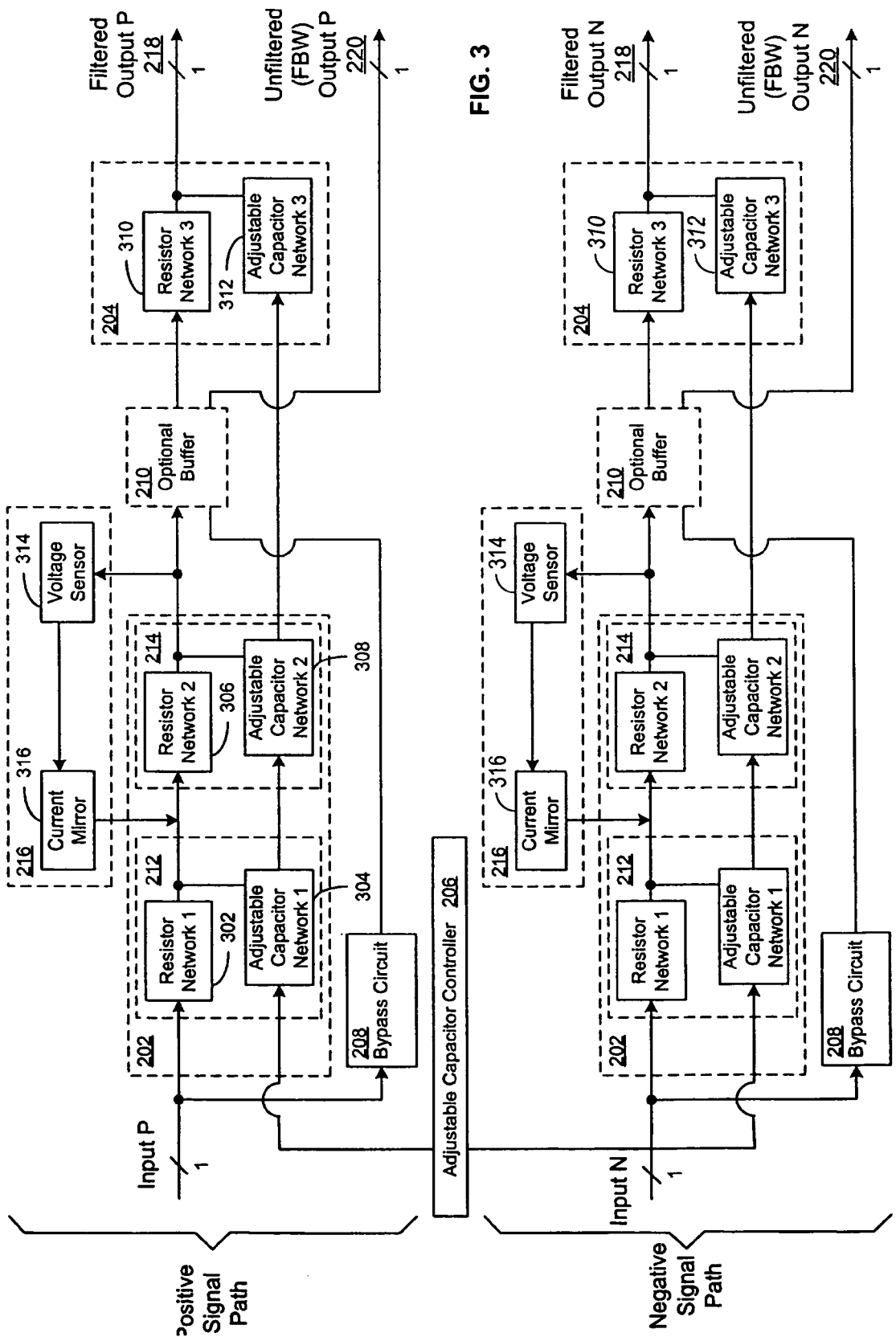
FIG. 3 illustrates a detailed block diagram of the filter circuit FIG. 1.

FIG. 3 illustrates an embodiment of the filter circuit of FIG. 2. This embodiment includes a positive signal path for filtering a positive input (Input P) and a negative signal path for filtering a negative input (Input N). The positive and negative signals form a pair of differential signals. The positive signal path implements a corresponding first bit slice of the first filter chain 202, the second filter chain 204, the adjustable capacitor controller 206, the bypass circuit 208 and the optional buffer 210 of FIG. 2. In the first filter chain 202, the first filter 212 is implemented by a first resistor network 302 and a first adjustable capacitor network 304, and the second filter 214 implemented by a second resistor network 306 and a second adjustable capacitor network 308. Together, the first and second filters of the first filter chain form first and second poles of the filter circuit. The second filter chain 204 is implemented by a third resistor network 310 and a third adjustable capacitor network 312. The third resistor network 310 and the third adjustable capacitor network 312 form a third pole of the filter circuit. The output of the second filter chain 204 is a corresponding first bit of the filtered circuit output P 218. In the bypass path, the laser signal is not filtered by any of the filter circuits, where the laser signal passes through the option buffer 210 before it is sent to the next page. The output of the bypass path is a corresponding first bit of the unfiltered output P 220.

The adjustable capacitor controller 206 is configured to generate capacitor switch control signals based on an operating frequency of the input laser signal for adjusting the capacitance of the first, second and third adjustable capacitors networks 304, 308 and 312 respectively. The capacitance of the adjustable capacitor networks may be adjusted not only for handling different operating frequencies of the input laser signal, for example twice or four times the normal operating frequency, it may also be adjusted to compensate for deviations caused by variations in manufacturing of the laser filter integrated circuit to improve signal quality of the filter circuit. The adjustable capacitor controller 206 may selectively control one or more adjustable capacitor networks in the first or second filter chains 202, 204 to achieve a desired signal quality level. In some embodiments, adjustable capacitor controller 206 may generate distinct control signals for controlling individual ones or different groups of the adjustable capacitor networks 304, 308, 312. In some embodiments, the adjustable capacitor controller 206 may generate distinct control signals for controlling only a subset of the capacitor networks 304, 308, 312.

In some embodiments, the filter chain 202 is a second order or higher order filter. Such a filter chain will have a strong roll off in its frequency response below the filter chain's cutoff frequency unless remedial circuitry is used. A feedback circuit 216 is coupled between an output terminal and an input terminal of a particular filter in the filter chain 202, and it is configured to enhance the frequency response of the filter circuit in accordance with a predetermined set of application requirements. In some embodiments, the feedback circuit that is used to boost the Q factor of the filter chain 202, and more particularly to boost the frequency response of the filter chain 202 at frequencies below the cutoff frequency of filter chain. As a result, the filter chain 202 has a flatter filter response that it would have without the feedback circuit 216.

In some embodiments, the feedback circuit 216 is implemented by a voltage sensor 314 and a current mirror 316. The voltage sensor 314 is configured to produce a bias current in accordance with a voltage level sensed at the output terminal of the particular filter. The current mirror 316 is configured to produce a current in proportion to the bias current generated by the voltage source 314. The current mirror 316 has an input terminal coupled to the voltage sensor 314 and an output terminal coupled to the corresponding input terminal of the particular filter. In some embodiments, one or more additional feedback circuits 216 are used in conjunction with one or more additional filter circuits.

Similar to the positive signal path discussed above, the negative signal path implements a corresponding second bit slice of the first filter chain 202, the second filter chain 204, the adjustable capacitor controller 206, the bypass circuit 208 and the optional buffer 210 of FIG. 2. The structure and circuit components of the negative signal path and the positive signal path are the same, except that the input of the negative signal path in Input N, and the outputs of the negative signal path are a corresponding second bit of the filtered output N 218 and a corresponding second bit of the unfiltered output N 220.

FIG. 4A illustrates an implementation of the optional buffer 210 of FIG. 2. The optional buffer 210 includes a transistor 402 having a base terminal coupled to an input, a collector terminal coupled to a power supply Vdd, and an emitter terminal coupled to an output. This circuit implements an emitter follower circuit such that when the input is high, the output follows and is also high, and when the input is low, the transistor is off and the output is low.

FIG. 4B illustrates an implementation of the bypass circuit 208 of FIG. 2. The bypass circuit 208 includes a pass-gate transistor 404 having a drain terminal coupled to an input port, a source terminal coupled to an output port, and a gate terminal coupled to a control signal, which controls the passing of a signal from the input port to the output port through the pass-gate transistor 404.

FIG. 4C illustrates an implementation of the voltage sensor 314 of FIG. 3. The voltage sensor includes a transistor 408 having a base terminal coupled to a bias voltage (Vbias) via a first transistor 410, a collector terminal coupled to an output, and an emitter terminal coupled to a power supply Vss through a second resistor 412. The bias voltage is produced by a suitable bias voltage generator circuit (not shown) that is either internal or external to the integrated circuit on which the filter circuit 106 resides. In some embodiments, the bias voltage varies in accordance with (e.g., varies in proportion to) the absolute temperature of the feedback circuit and is relatively invariant with respect to the power supply voltage of the feedback circuit.

FIG. 4D illustrates an implementation of the current mirror 316 of FIG. 3. The current mirror includes a differential pair of transistors, a first current source, and a second current source. The differential pair of transistors includes a first transistor 420 having a base terminal coupled to a positive input (Input P), a collector terminal coupled to a positive output (Output P), and an emitter terminal coupled to the first current source. The differential pair of transistors also includes a second transistor 422 having a base terminal coupled to a negative input (Input N), a collector coupled to a negative output (Output N), and an emitter terminal coupled to the second current source and coupled to the emitter of the first transistor via a capacitor 424. In some embodiments, the first current source is implemented with a transistor 426 having a base terminal of the first transistor 420 of the differential pair of transistors, and an emitter coupled to a power supply (Vss) via a first resistor 430. Similarly, in some embodiments the second current source is implemented with a transistor 432 having a base terminal coupled to the predetermined bias voltage (Vbias) 428, a collector terminal coupled to the emitter terminal of the second transistor 422 of the differential pair of transistors, and an emitter terminal coupled to the power supply (Vss) via a second resistor 434. In some embodiments the bias voltage Vbias varies in accordance with absolute temperature of the feedback circuit 216, but is relatively invariant with respect to the support voltage of the feedback circuit 216.

Figure 5:
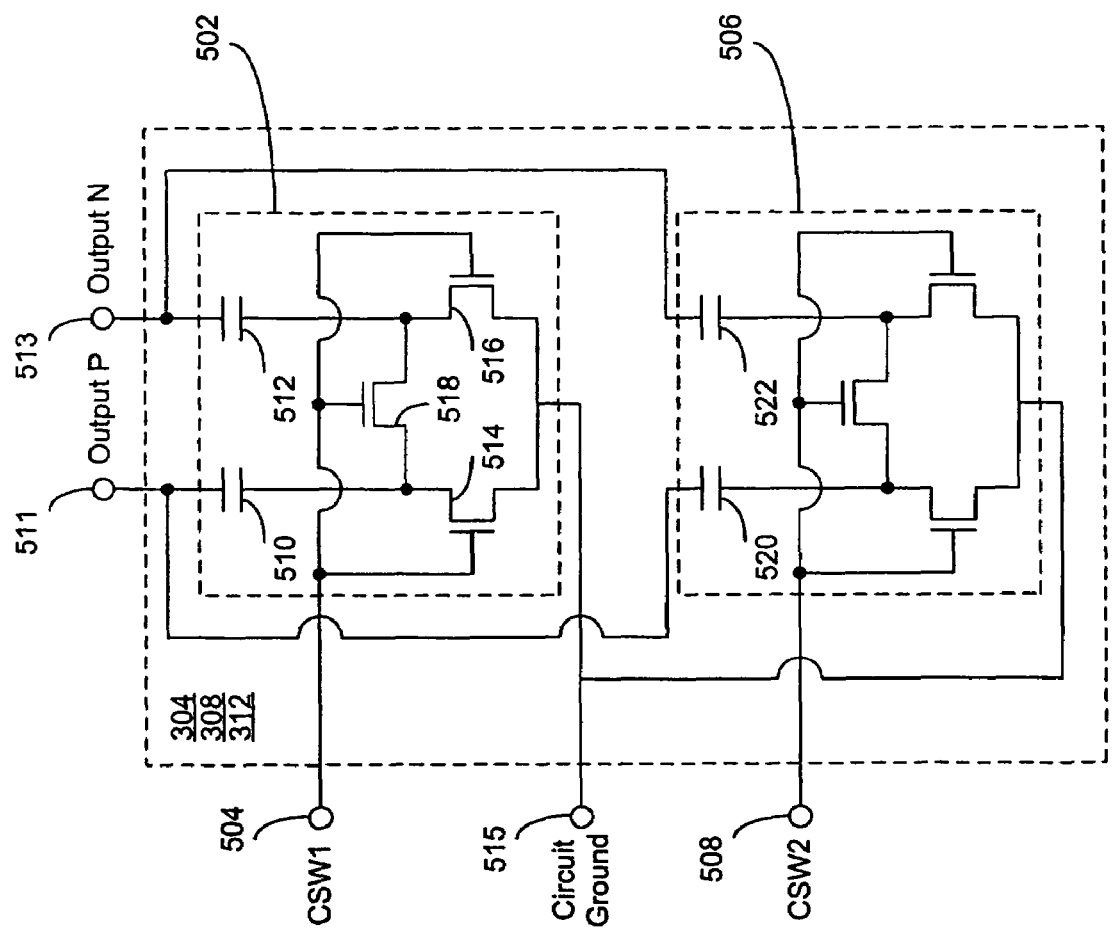
FIG. 5 illustrates an implementation of one of the adjustable capacitor networks of FIG. 3.

FIG. 5 illustrates an implementation of one of the adjustable capacitor networks 304, 308, 312 of FIG. 3. The exemplary adjustable capacitor networks illustrated in FIG. 5 include two substantially identical switchable capacitor networks connected in parallel, a first switchable capacitor network 502 controlled by a first capacitor switch control signal CSW1 504, and a second switchable capacitor network 506 controlled by a second capacitor switch control signal CSW2 508.

The first switchable capacitor network 502 includes a first capacitor 510 coupled to a first output terminal (Output P) 511, a second capacitor 512 coupled to a second output terminal (Output N) 513, a first transistor 514 having a gate terminal coupled to the first capacitor switch control signal CSW1 504, a drain terminal coupled to the first output terminal 511 through the first capacitor 510, and a source terminal coupled to the circuit ground 515. The first switchable capacitor network also includes a second transistor 516 having a gate terminal coupled to the first capacitor switch control signal 504, a drain terminal coupled to the second output terminal 513 through the second capacitor 512, and a source terminal coupled to the circuit ground 515. The first switchable capacitor network further includes a third transistor 518 having a gate terminal coupled to the first capacitor network further includes a third transistor 518 having a gate terminal coupled to the first capacitor switch control signal 504, a drain terminal coupled to the drain terminal of the first transistor 514, and a source terminal controlled to a drain terminal of the second transistor 516.

When the first capacitor switch control signal (CSW1) 504 is asserted, the transistors 514, 516, 518 are on and which collectively behave like a conducting path connecting the output terminals (Output P and Output N) to the circuit ground 515. The capacitance seen at the output terminal (Output P) 511 is the first capacitor 510, and the capacitance seen at the output terminal (Output N) 513 is the second capacitor 512. When the first capacitor switch control signal (CSW1) 504 is deasserted, the transistors 514, 516 and 518 are off and which collectively behave like a high impedance path disconnected the first and second capacitors 510 and 512 from the circuit ground 515. The contribution of the capacitor 510 to the output terminal (Output P) 511 and the contribution of the capacitor 512 to the output terminal (Output N) 513 are significant when the first capacitor switch control signal 504 is deasserted The second switchable capacitor network 506 has a substantially identical structure as the first switchable capacitor network 502, except that it is controlled by a second capacitor switch control signal CSW2 508. The capacitance contribution of the second switchable capacitor network 506 is additive to the capacitance contribution of the first switchable capacitor network 502. The outputs of the second switchable capacitor network are coupled to the first output (Output P) 511 and to the second output (Output N) 513 respectively. In some embodiments, the capacitors 520, 522 of the second switchable capacitor network 506 have higher or lower capacitance than the capacitors 510, 512 of the first switchable capacitor network. In some embodiments, the capacitors 520, 522 of the second switchable capacitor network 506 have approximately twice the capacitance of the capacitors 510, 512 of the first switchable capacitor network, thereby providing the ability to switch to capacitances of 1X, 2X and 3X, where X is the capacitance of capacitors 510, 512 through the use of two control signals, CSW1 and CSW2. In other embodiments the capacitors 520, 522 of the second switchable capacitor network 506 have approximately the same capacitance as the capacitors 510, 512 of the first switchable capacitor network.

The filter circuit described above has at least four advantages. First, it eliminates the external components, such as inductors, capacitors and resistors, normally used to implement laser signal filter circuits. It does this by implementing the filter circuit within an integrated circuit. Hence, it reduces the cost of the system because the more expensive external circuit components are replaced with components within an integrated circuit, which have substantially lower costs. Second, it minimizes the board space necessary for implementing the filter circuit. Third, the disclosed filter circuit may support a wider range of applications without degrading the filter quality since the frequency response of each individual filter within the filter circuit may be adjusted to work with a broader signal bandwidth. For example, the frequency response of the filter circuit may be programmed to support a normal transmission rate, as well as to support twice or four ties the normal transmission rate. Fourth, the filter circuit supports fine adjustments of the frequency response of selected filters by tuning the capacitors within the filter circuit to compensate for deviations caused by variations in the manufacturing of the integrated circuit containing the filter circuit.

One skilled in the relevant are will recognize that there are many possible modifications of the disclosed embodiments that could be used, while still employing the same basic underlying mechanisms and methodologies. For example, different typs of transistors, such as FET or MOS transistors, may be used to implement the filter circuit. Different numbers of adjustable capacitor networks may be employed for each selected filter so as to obtain a desired range of capacitance for the selected filter. Furthermore, one or more filter chains may be used in implementing the filter circuit and one or more filters may be included in each filter chain.

Embodiments may be described in functional language with reference to means for performing the particular function. For example, one embodiment may include means for receiving an input laser signal. The corresponding structure for the means for receiving the input laser signal may be for example, various printed circuit board traces and terminals such as the interface described for connecting the transimpedance amplifier 104 and the filter circuit 106 shown in FIG. 1.

Embodiments may further include means for filtering the input laser signal to generate a filtered signal. The corresponding structure for the means for filtering the input laser signal may be, for example, the first filter chain 202 illustrated in FIG. 2.

Embodiments may include means for generating one or more capacitor switch control signals in accordance with an operating frequency of the input laser signal. The corresponding structure for the means for generating one or more capacitor switch control signals may be, for example, the adjustable capacitor controller 206 illustrated in FIG. 2.

One embodiment includes a means for adjusting the capacitance of one or more adjustable capacitor networks in a first filter chain. The corresponding structure for the means for adjusting the capacitance of one or more adjustable capacitor networks may include, for example, elements of the adjustable capacitor controller 206 and the adjustable capacitor networks 304, 308 and 312 shown in FIG. 3.

Embodiments may include means for outputting the filtered signal. The corresponding structure for the means for outputting the filtered signal may include, for example, various connectors and traces including the filtered outputs 218 shown in FIG. 2.

Embodiments may further include means for receiving an optical signal. Corresponding structure to these means may include the photodetector 102 and transimpedance amplifier 104 respectively as shown in FIG. 1.

Embodiments may further include means for enhancing the frequency response of a laser filter circuit in accordance with a predetermined set of application requirements. Structure corresponding to the means for enhancing the frequency response may include, for example, a feedback circuit such as the feedback circuit 216 shown in FIG. 2. The means for enhancing the frequency response of the laser filter circuit may further include means for producing a bias current in accordance with a voltage level sensed at the output terminal of the particular filter, means for producing a feedback current signal in proportion to the bias current, and means for coupling the feedback current signal to the input terminal of the particular filter. Structure corresponding to the means for producing a bias current may include, for example, the voltage sensor 314 illustrated in FIG. 3. The corresponding structure to the means for producing a feedback current signal in proportion to the bias current may include, for example, the current mirror 316 illustrated in FIG. 3. Structure corresponding to the means for coupling the feedback current signal to the input terminal of a particular filter may include various connectors and circuit board traces as is illustrated by the connection between the current mirror 316 and the resistor network 306 shown in FIG. 3.

Embodiments may further include means for generating an unfiltered signal and means for outputting the unfiltered signal. Corresponding structure for the recited means may include, for example, the bypass circuit 208 and unfiltered output 220 respectively shown in FIG. 2.

Further still, embodiments may include means for generating a second filtered signal. The corresponding structure to the means for generating a second filtered signal may include, for example, the second filter chain 204 illustrated in FIG. 2.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A laser filter circuit for filtering a laser signal, comprising:
   an input terminal configured to receive an input laser signal;
   a first filter chain configured to generate a filtered signal, wherein the first filter chain is coupled to the input terminal and has one or more filters connected in series and each filter comprises one or more adjustable capacitor networks;
   an adjustable capacitor controller configured to generate one or more capacitor switch control signals in accordance with an operating frequency of the input laser signal for adjusting the capacitance of the one or more adjustable capacitor networks in the first filter chain;
   one or more output terminals configured to output the filtered signal from the first filter chain;
   a bypass circuit coupled to the input terminal and configured to output an unfiltered signal, wherein the one or more output terminals include at least one bypass output terminal configured to output the unfiltered signal from the bypass circuit; and
   a feedback circuit coupled between an output terminal and an input terminal of a particular filter in the first filter chain, wherein the feedback circuit is configured to enhance the frequency response of the laser filter circuit in accordance with a predetermined set of application requirements, the feedback circuit comprising:
      a voltage sensor configured to produce a current in accordance with a voltage level sensed at the output terminal of the particular filter; and a current mirror having an input terminal coupled to the voltage sensor and an output terminal coupled to the corresponding input terminal of the particular filter, wherein the current mirror is configured to produce a current in proportion to the current generated by the voltage sensor.

2. The laser filter circuit of claim 1, wherein the input terminal is coupled to a trans-impedance amplifier from which the input laser signal is received, and wherein the trans-impedance amplifier is coupled to a photo detector configured to receive an optical laser signal.

3. A method for filtering a laser signal, comprising:

receiving an input laser signal at an input terminal;

filtering the input laser signal using a first filter chain to generate a filtered signal, wherein the first filter chain has one or more filters connected in series and each filter comprises one or more adjustable capacitor networks;

generating one or more capacitor switch control signals in accordance with an operating frequency of the input laser signal;

adjusting the capacitance of the one or more adjustable capacitor networks in the first filter chain in accordance with the one or more capacitor switch signals; and outputting the filtered signal;

generating a second filtered signal using a second filter chain, wherein the second filter chain is configured to receive the filtered signal from the first filter chain, and has one or more filters connected in series and each filter in the second filter chain comprises a resistor network and a capacitor network; and enhancing the frequency response of the laser filter circuit in accordance with a predetermined set of application requirements by using feedback from an output terminal to an input terminal of a particular filter in the first filter chain, comprising:

producing a bias in accordance with a voltage level sensed at the output terminal of the particular filter;

producing a feedback current signal in proportion to the bias current; and coupling the feedback current signal to the input terminal of the particular filter.

4. The method of claim 3, including receiving an optical laser signal, and amplifying the optical laser signal using a trans-impedance amplifier to generate the input laser signal.

5. The method of claim 3 wherein the producing a bias current includes using a voltage sensor to produce the bias current.

6. The method of claim 3 further comprising:

generating an unfiltered signal using a bypass circuit coupled to the input terminal; and outputting the unfiltered signal.

7. An apparatus for filtering a laser signal, the apparatus comprising:

means for receiving an input laser signal;

means for filtering the input laser signal to generate a filtered signal;

means for generating one or more capacitor switch control signals in accordance with an operating frequency of the input laser signal;

means for adjusting the capacitance of one or more adjustable capacitor networks in a first filter chain in accordance with the one or more capacitor switch signals;

means for outputting the filtered signal; and means for enhancing the frequency response of a laser filter circuit in accordance with a predetermined set of application requirements, comprising:

means for producing a bias current in accordance with a voltage level sensed at the output terminal of the particular filter;

means for producing a feedback current signal in proportion to the bias current; and means for coupling the feedback current signal to the input terminal of the particular filter.

8. The apparatus of claim 7, further comprising:

means for receiving an optical laser signal, and means for amplifying the optical laser signal to generate the input laser signal.

9. The apparatus of claim 7 further comprising:

means for generating an unfiltered signal; and means for outputting the unfiltered signal.

10. The apparatus of claim 7 further comprising means for generating a second filtered signal.

* * * * *

UNITED STATES PATENT AND TRADEMARK OFFICE
CERTIFICATE OF CORRECTION

PATENT NO. : 7,502,565 B2  Page 1 of 1
APPLICATION NO. : 11/072377
DATED : March 10, 2009
INVENTOR(S) : Moran It is certified that error appears in the above-identified patent and that said Letters Patent is hereby corrected as shown below:

On the Title Page
Item (57) Abstract, change "A plurality of output terminal output" to --A plurality of output terminals output--

Column 1
Line 41, change "to support of a" to --to support a--

Column 2
Line 10, change "form" to --from--
Line 42, change "FIG. 1" to --of FIG. 1--

Column 4
Line 38, change "that" to --than--

Column 6
Line 22, change "disconnected the" to --disconnected from the--
Line 66, change "ties" to --times--

Column 7
Line 5, change "are" to --art--

Signed and Sealed this

Twenty-third Day of February, 2010

David J. Kappos
*Director of the United States Patent and Trademark Office*